US012146862B2

(12) United States Patent
Cho et al.

(10) Patent No.: US 12,146,862 B2
(45) Date of Patent: Nov. 19, 2024

(54) INSPECTION APPARATUS FOR A PRESSURE VESSEL

(71) Applicants: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

(72) Inventors: Yong Joo Cho, Seoul (KR); Jung Ryul Lee, Daejeon (KR); Yong Ho Kim, Daejeon (KR)

(73) Assignees: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 314 days.

(21) Appl. No.: 17/859,423

(22) Filed: Jul. 7, 2022

(65) Prior Publication Data

US 2023/0123853 A1    Apr. 20, 2023

(30) Foreign Application Priority Data

Oct. 18, 2021    (KR) .................. 10-2021-0138720

(51) Int. Cl.
*G01N 29/04*    (2006.01)
*G01B 9/02*    (2022.01)
(Continued)

(52) U.S. Cl.
CPC ....... *G01N 29/2418* (2013.01); *G01N 29/227* (2013.01); *G01N 2291/02872* (2013.01); *G01N 2291/2695* (2013.01)

(58) Field of Classification Search
CPC ........ G01N 29/00; G01N 29/04; G01N 29/22; G01N 29/227; G01N 29/24;
(Continued)

(56) References Cited

U.S. PATENT DOCUMENTS

| 7,113,660 B2 | 9/2006 | Andrews et al. |
| 7,412,890 B1 | 8/2008 | Johnson et al. |
| 9,470,623 B2 * | 10/2016 | Sano ...................... G01N 29/46 |

FOREIGN PATENT DOCUMENTS

| JP | 2015114206 A | 6/2015 |
| JP | 2018119894 A | 8/2018 |

(Continued)

OTHER PUBLICATIONS

Machine Translation of KR-20210050336-A (Year: 2021).*
(Continued)

*Primary Examiner* — Nguyen Q. Ha
(74) *Attorney, Agent, or Firm* — Lempia Summerfield Katz LLC (57) ABSTRACT

An inspection apparatus inspects a pressure vessel using laser ultrasound. The apparatus includes an oscillation device that oscillates an excitation laser for exciting the pressure vessel and a conduit to guide the excitation laser oscillated from the oscillation device to inside the pressure vessel. The conduit is inserted into the pressure vessel with one conduit end located inside the pressure vessel and an opposite end located outside the pressure vessel. The apparatus includes a reflector at one conduit end inside the pressure vessel to reflect the excitation laser guided by the conduit and a detector that detects ultrasonic waves generated in the pressure vessel by the excitation laser reflected by the reflector by oscillating a receiving laser from outside of
(Continued)

the pressure vessel. At least the conduit, reflector, or detector moves to correct an optical path of the excitation laser or the receiving laser.

12 Claims, 8 Drawing Sheets

(51) Int. Cl.
*G01N 29/22* (2006.01)
*G01N 29/24* (2006.01)

(58) Field of Classification Search
CPC ..... G01N 29/2418; G01N 2291/02872; G01N 2291/2695; G01B 9/02
See application file for complete search history.

(56) References Cited

FOREIGN PATENT DOCUMENTS

| JP | 2019148295 | A |   | 9/2019  |              |
|----|------------|---|---|---------|--------------|
| JP | 2020071175 | A |   | 5/2020  |              |
| KR | 101639186  | B1|   | 7/2016  |              |
| KR | 20210050336| A | * | 5/2021  | ......... G01N 21/1702 |
| WO | 2017187818 | A1|   | 11/2017 |              |

OTHER PUBLICATIONS

Yoji Okabe et al., Ultrasonic NDT/SHM methods using optical fiber sensors for composites in extreme environments, 1st Workshop on Energy Storage Systems for Mobile Applications @IIS, Univ. Tokyo, Oct. 15, 2019; 35 pp.

\* cited by examiner

INSPECTION APPARATUS FOR A PRESSURE VESSEL

CROSS-REFERENCE TO RELATED APPLICATION

This application claims the benefit of and priority to Korean Patent Application No. 10-2021-0138720, filed in the Korean Intellectual Property Office on Oct. 18, 2021, the entire contents of which are incorporated herein by reference.

TECHNICAL FIELD

The present disclosure relates to an inspection apparatus for a pressure vessel, such as for inspecting a type 4 pressure vessel.

BACKGROUND

In general, it is very difficult to insert an inspection apparatus into a pressure vessel to inspect the structure of the pressure vessel. Accordingly, the inspection of a pressure vessel has been mainly performed from the outside of the pressure vessel. For example, U.S. Pat. No. 7,113,660 (Patent document 1) discloses an apparatus for detecting a defect in a pressure vessel using an optical fiber attached to an outer surface of the pressure vessel. However, because the apparatus disclosed in Patent Document 1 uses an optical fiber attached to the outer surface of the pressure vessel, only surface defects of the pressure vessel may be detected. In addition, because the optical fiber is attached to the surface of the pressure vessel, damage may occur due to an impact applied from the outside.

Meanwhile, a hydrogen fuel cell vehicle usually uses a type 4 pressure vessel for the storage of hydrogen. The type 4 pressure vessel is a vessel formed by winding a carbon fiber composite material on a non-metal liner. The pressure vessel for a hydrogen fuel cell vehicle is frequently exposed to an environment in which expansion and contraction repeatedly occur, according to the charging and discharging of hydrogen. For this reason, it is easy to generate a defect in the form of delamination in the laminated section of the composite material. The occurrence of defects may reduce the mechanical performance of the pressure vessel. Because a person is seated in a hydrogen fuel cell vehicle, it is very important to ensure safety by detecting the occurrence of a defect in advance.

The apparatus of Korean Unexamined Patent Publication No. 10-2021-0050336 (Patent document 2) discloses a device that is inserted into the inside of a pressure vessel to oscillate an excitation laser. Further, the apparatus of Patent document 2 discloses a device that is capable of performing defect inspection on the overall thickness and overall length of such a type 4 pressure vessel through a device that emits a receiving laser. However, in the apparatus of Patent document 2, the path of the excitation laser and the path of the receiving laser cannot be corrected, therefore decreasing the accuracy of the inspection.

SUMMARY

The present disclosure has been made to solve the above-mentioned problems occurring in the prior art while advantages achieved by the prior art are maintained intact.

An aspect of the present disclosure provides an inspection apparatus for a pressure vessel with improved inspection accuracy.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an inspection apparatus for a pressure vessel includes an oscillation device that oscillates an excitation laser to excite the pressure vessel and a conduit extending in a reference direction to guide the excitation laser oscillated from the oscillation device to an inside of the pressure vessel. The conduit is inserted into the pressure vessel such that the conduit has one end located inside the pressure vessel and an opposite end located outside the pressure vessel. Further, the inspection apparatus includes a reflector provided at the one end of the conduit located inside the pressure vessel to reflect the excitation laser guided by the conduit in a specified direction. In addition, the inspection apparatus includes a detector that detects ultrasonic waves generated in the pressure vessel by the excitation laser reflected by the reflector by oscillating a receiving laser from the outside of the pressure vessel. At least one of the conduit, the reflector, and/or the detector moves to correct an optical path of the excitation laser or the receiving laser.

According to an embodiment, the conduit may be provided to be rotatable about a virtual reference axis extending in the reference direction. Further, the reflector is provided to rotate interlocking with rotation of the conduit. An optical path of the excitation laser is modified according to the rotation of the reflector.

According to an embodiment, the detector may be movable in the reference direction and in a direction opposite to the reference direction.

According to an embodiment, the inspection apparatus may further include a conduit rotator coupled to the conduit to rotate the conduit about a virtual reference axis extending in the reference direction, a detection movement device coupled to the detector to move the detector in the reference direction and an opposite direction to the reference direction, and a controller. The controller may be electrically connected to the conduit rotator to control rotation of the conduit and may be electrically connected to the detection movement device to control movement of the detector.

According to an embodiment, the controller may control the conduit rotator and the detection movement device to allow a first point and a second point to be located at positions corresponding to each other. The first point may be a point at which the reflector reflects the excitation laser oscillated by the oscillation device to reach an inner surface of the pressure vessel. The second point may be a point at which the receiving laser oscillated by the detector reaches an outer surface of the pressure vessel.

According to an embodiment, the controller may control the detection movement device to perform a second movement after controlling the conduit rotator to perform a first movement. The first movement may be a movement performed by the conduit rotator to allow the excitation laser to reach the first point. The second movement may be a movement performed by the detection movement device to allow the receiving laser to reach the second point.

According to an embodiment, the detection movement device may include a rail member extending in the reference direction and may include a transfer member. The transfer member may be movable along the rail member in the reference direction and the opposite direction and may be coupled to the detector.

According to an embodiment, the inspection apparatus may further include a rotation device provided to rotate the pressure vessel around the reference direction.

According to an embodiment, the inspection apparatus may further include a support part that includes a first support and a second support. The first support may be configured to support one end of the pressure vessel such that the pressure vessel is rotatable. The second support may be configured to support another end of the pressure vessel such that the pressure vessel is rotatable.

According to an embodiment, the pressure vessel may include a cylinder provided to store gas therein and may include first and second bosses respectively provided at one end and another end of the cylinder. The support part may further include a first rotation shaft that is detachably fastened to the first boss to rotate together with the pressure vessel and that is rotatably supported by the first support. The support part may also include a second rotation shaft that is detachably fastened to the second boss to rotate together with the pressure vessel and that is rotatably supported by the second support.

According to an embodiment, the second rotation shaft may be formed in a pipe shape having an inner hollow, be formed in the second boss, and be inserted into a through-hole providing communication between the inside and the outside of the pressure vessel. Further, the conduit may be inserted from the outside to the inside of the pressure vessel through the inner hollow of the second rotation shaft.

According to an embodiment, the inspection apparatus may further include a movement device provided to move the support part in the reference direction and the opposite direction while the support part supports the pressure vessel.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numbers are used throughout to designate the same or equivalent elements. In addition, a detailed description of well-known features or functions has been omitted in order not to unnecessarily obscure the gist of the present disclosure. When a component, device, element, apparatus, or the like of the present disclosure is described as having a purpose or performing an operation, function, or the like, the component, device, apparatus, or element should be considered herein as being "configured to" meet that purpose or to perform that operation or function.

A scheme of using laser ultrasound to inspect a pressure vessel for storing hydrogen or the like in a non-destructive manner may be considered. A laser ultrasonic inspection scheme refers to a scheme of inspecting for defects in a structure by generating an ultrasonic wave inside the structure using a pulsed laser and further detecting defects using another laser.

An inspection apparatus, according to an embodiment of the present disclosure, is an inspection apparatus for inspecting a pressure vessel using a laser ultrasonic wave. The inspection apparatus guides an excitation laser beam through a conduit to the inside of the pressure vessel even when inspecting the pressure vessel and reflects the excitation laser beam guided to the inside of the vessel to excite the inner surface of the pressure vessel.

Figure 1:
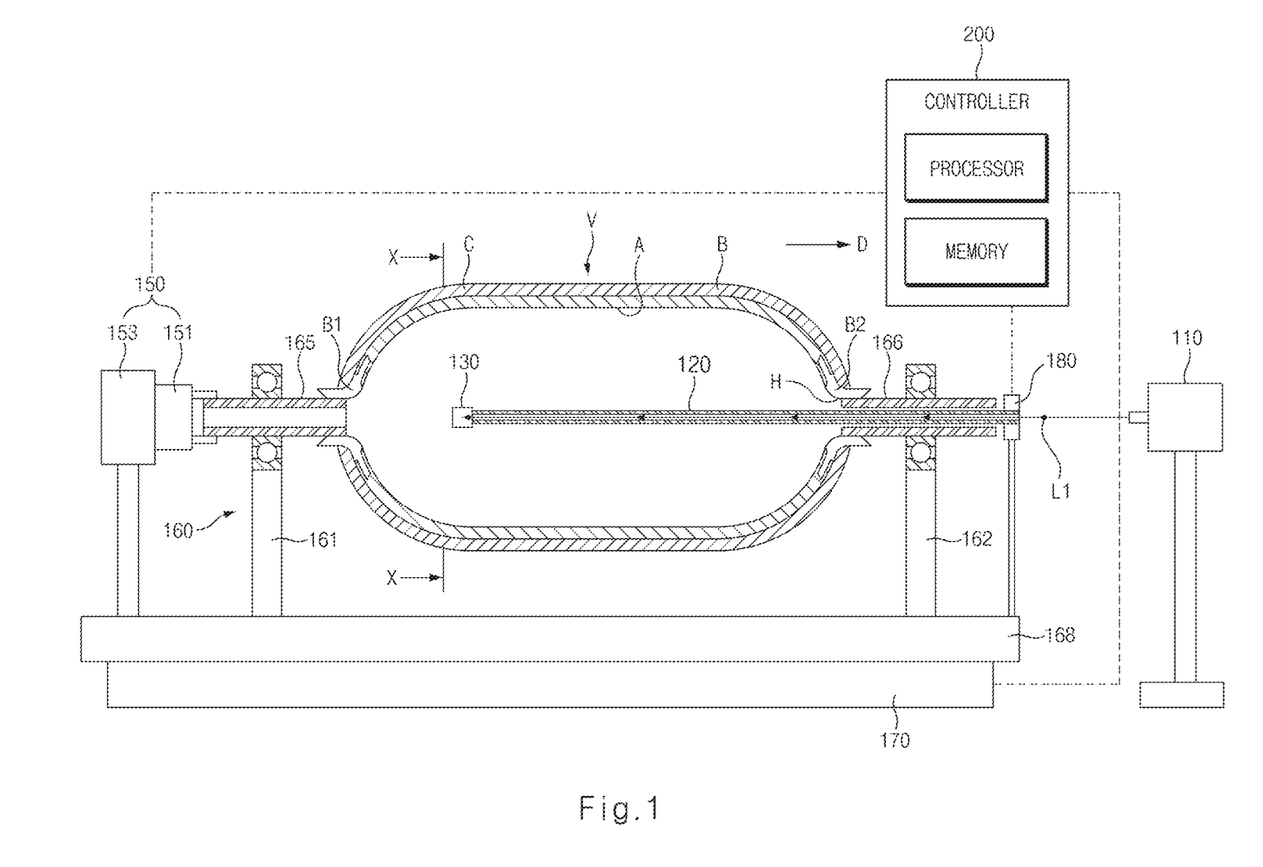
FIG. 1 is a front view illustrating an inspection apparatus according to an embodiment of the present disclosure.
Figure 2:
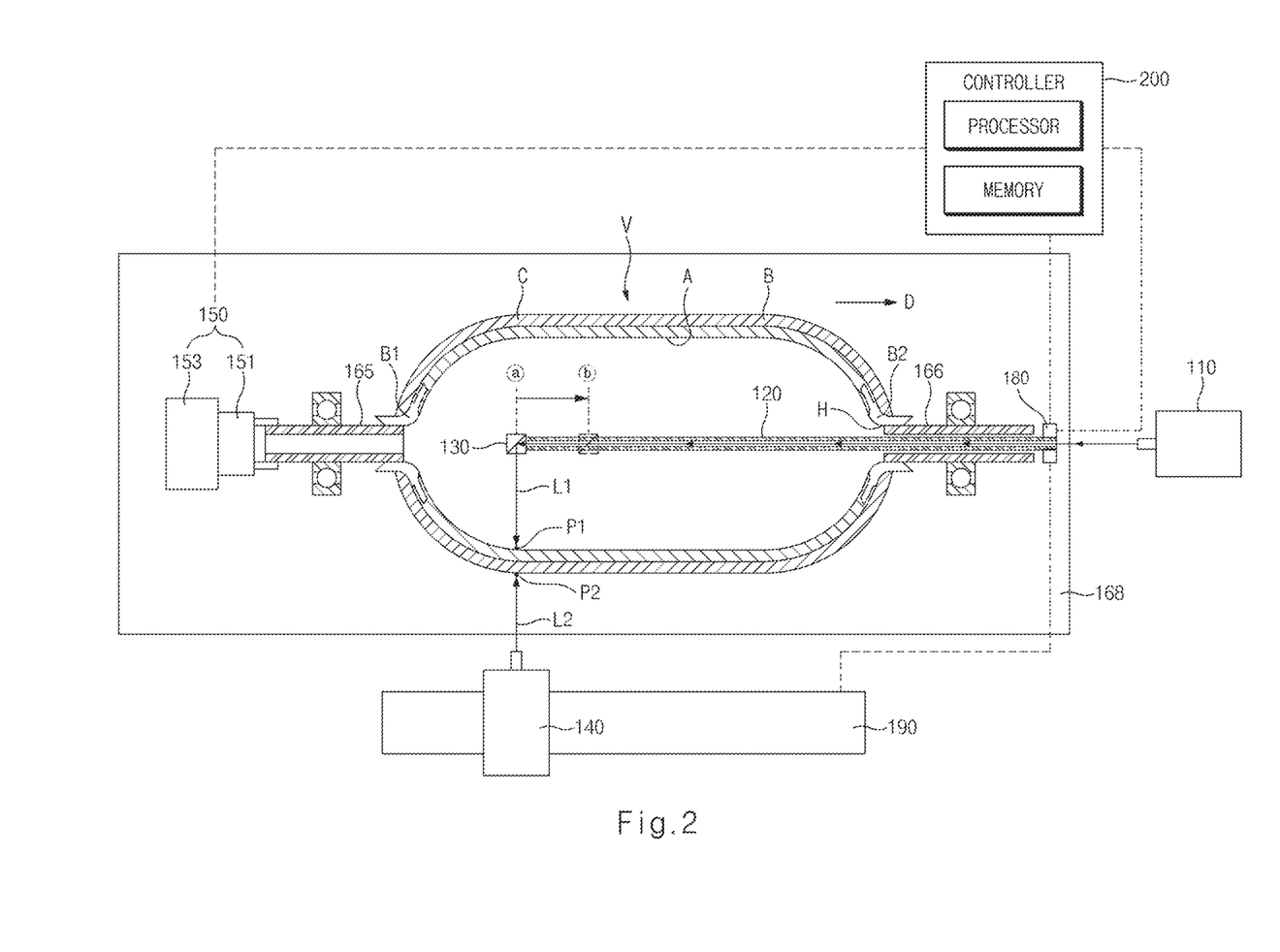
FIG. 2 is a top view of the inspection apparatus of FIG. 1 as viewed from above.

An inspection apparatus according to an embodiment of the present disclosure is described in detail with reference to FIGS. 1 and 2. FIG. 1 is a front view illustrating an inspection apparatus according to an embodiment of the present disclosure. FIG. 2 is a top view of the inspection apparatus of FIG. 1 as viewed from above.

As shown in FIGS. 1 and 2, an inspection apparatus according to an embodiment includes an oscillation device 110, a conduit 120, a reflector 130, and a detector 140 (e.g., a measurement laser detector; see FIG. 2).

The oscillation device 110 is provided to oscillate an excitation laser L1 for exciting a type 4 pressure vessel "V".

The oscillation device 110 may be a laser excitation device commonly used in a laser ultrasonic inspection scheme. The oscillation device 110 may irradiate a laser having a constant pulse width.

The conduit 120 is provided to guide the excitation laser L1 oscillated from the oscillation device 110 to the inside of the pressure vessel "V". To this end, the conduit 120 may extend in a reference direction "D". The reference direction "D" may be a direction from the inside of the pressure vessel "V" toward the outside of the pressure vessel "V".

The conduit 120 may be inserted into the pressure vessel "V", such that one end of the conduit 120 is located inside the pressure vessel "V", and the other end, i.e., a remaining end or opposite of the conduit 120 is located outside the pressure vessel "V". The remaining end of the conduit 120 may be located adjacent to the oscillation device 110 to be irradiated with the excitation laser L1 from the oscillation device 110. When the oscillation device 110 irradiates the excitation laser L1 toward the remaining end of the conduit 120, the irradiated excitation laser L1 may propagate to the inside of the pressure vessel "V" along the conduit 120. The conduit 120 may be a pipe having an inner hollow formed therein in the reference direction "D".

The reflector 130 is provided at one end of the conduit 120 located inside the pressure vessel "V" and is provided to reflect the excitation laser L1 guided by the conduit 120 in a specified direction. As shown in FIG. 2, the laser oscillated from the oscillation device 110 is guided from the outside of the pressure vessel "V" to the inside of the pressure vessel "V" along the conduit 120. The laser oscillated from the oscillation device 110 is then reflected in a specified direction by the reflector 130 provided at one end of the conduit 120. The reflector 130 may reflect the laser toward the detector 140. For example, the reflector 130 may reflect the laser in a direction orthogonal to the reference direction "D". To this end, as shown in FIG. 2, the reflector 130 may be configured as a mirror inclined at 45 degrees with respect to the reference direction "D".

The detector 140 is provided to detect the ultrasonic wave, which is generated in the pressure vessel "V" by the excitation laser L1 reflected by the reflector 130, at the outside of the pressure vessel "V" by using the receiving laser L2. As shown in FIG. 2, the detector 140 may be located in a direction orthogonal to the reference direction "D" and may be arranged to face a cylinder "C" of the pressure vessel "V". The detector 140 may oscillate the receiving laser L2.

As shown in FIGS. 1 and 2, in the inspection apparatus of the embodiment, both the oscillation device 110 and the detector 140 are located outside the pressure vessel "V". Nevertheless, the inspection apparatus of the embodiment may guide the laser of the oscillation device 110 to the inside of the pressure vessel "V" by the conduit 120, and reflect the laser guided to the inside of the pressure vessel "V" toward the detector 140 by the reflector 130, so that it is possible to implement a volume wave transmission type inspection apparatus.

<Structure to Improve Accuracy of Inspection>

An inspection apparatus, according to an embodiment of the present disclosure, has high (e.g., desirable) inspection accuracy. To this end, in the inspection apparatus according to an embodiment of the present disclosure, at least one of the conduit 120, the reflector 130, and/or the detector 140 may move to correct an optical path of the excitation laser L1 or the receiving laser L2. In more detail, the conduit 120 or the reflector 130 may move to correct the optical path of the excitation laser L1, or the detector 140 may move to correct the optical path of the receiving laser L2, or both cases may happen simultaneously. Hereinafter, this is described in detail.

For example, the conduit 120 may be provided to be rotatable about a virtual reference axis extending in the reference direction "D". In this case, the reflector 130 may be provided to rotate interlocking with the rotation of the conduit 120. As the reflector 130 is rotated, the optical path of the excitation laser L1 may be corrected. However, this is only an example, and it is possible to implement the reflector 130 to be rotatable relative to the conduit 120. The correction of the optical path of the excitation laser L1 may mean that the location of the point at which the excitation laser L1 reaches the inside of the pressure vessel through the reflector 130 is changed.

As another example, the detector 140 may be movable in the reference direction "D" and the opposite direction. As the detector 140 moves in the reference direction "D" and the opposite direction, the optical path of the receiving laser L2, oscillated by the detector 140, may be modified. When the optical path of the receiving laser L2 is modified, it may mean that the location of the point at which the receiving laser L2, oscillated by the detector 140, reaches the outside of the pressure vessel is changed.

Hereinafter, an embodiment in which both the rotation of the conduit 120 and the movement of the detector 140 are possible are described in detail. However, as described above, the rotation of the conduit 120 and the movement of the detector 140 do not necessarily have to be possible together. Only one of them may be selectively possible according to the needs of a person having ordinary skill in the art.

Figure 3:
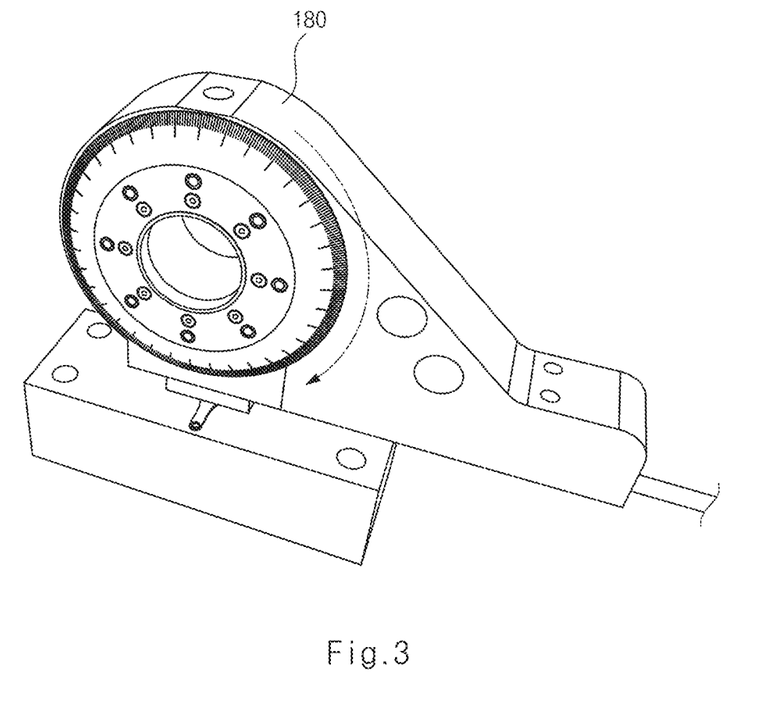
FIG. 3 is a view conceptually illustrating a conduit rotator of the inspection device of FIG. 1.
Figure 4:
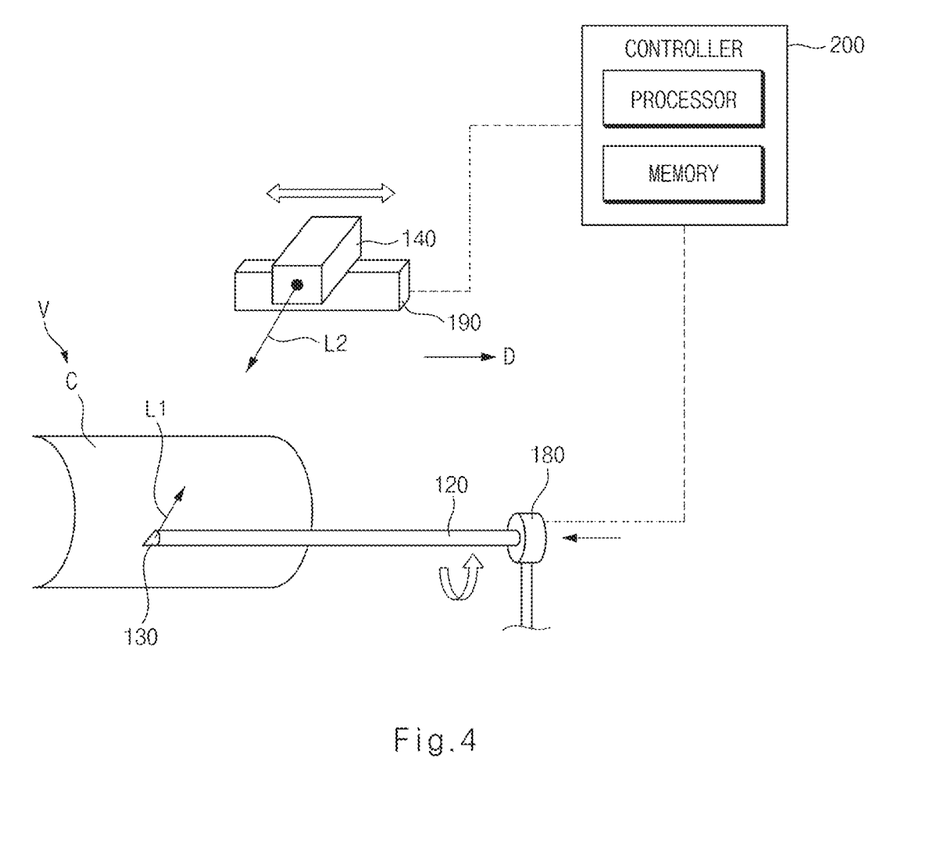
FIG. 4 is a view conceptually illustrating a conduit rotator and a detection movement device of the inspection apparatus of FIG. 1.

FIG. 3 is a view conceptually illustrating a conduit rotator of the inspection device of FIG. 1. FIG. 4 is a view conceptually illustrating a conduit rotator and a detection movement device of the inspection apparatus of FIG. 1. As shown in FIG. 4, an inspection apparatus according to an embodiment of the present disclosure may include a conduit rotator 180 and a detection movement device 190. The conduit rotator 180 may be coupled to the conduit 120 to rotate the conduit 120 about a reference axis. A rotation angle for displaying the rotation angle of the conduit 120 may be displayed on the conduit rotator 180 as a number.

The detection movement device 190 may be coupled to the detector 140 to move the detector 140 in the reference direction "D" and the opposite direction. For example, the detection movement device 190 may include a rail member and a transfer member. The rail member may extend in the reference direction "D". The transfer member may be movable in the reference direction "D" and the opposite direction along the rail member and may be coupled to the detector 140.

An inspection apparatus according to an embodiment of the present disclosure may include a controller 200. The controller 200 may be electrically connected to the conduit rotator 180 to control the rotation of the conduit 120. In addition, the controller 200 may be electrically connected to the detection movement device 190 to control the movement of the detector 140. In addition, the controller 200 may be provided to control a rotation device 150 or a movement device 170, or both, which is described below.

The controller 200 may include a processor and a memory. The processor may include a microprocessor such as a field programmable gate array (FPGA), an application specific integrated circuit (ASIC), or a central processing unit (CPU). The memory may store a plurality of control instructions, which is a basis for generating a command for controlling each component in the processor. The memory may be a data store such as a hard disk drive (HDD), a solid-state drive (SSD), a volatile medium, a non-volatile medium, and the like.

Figure 5:
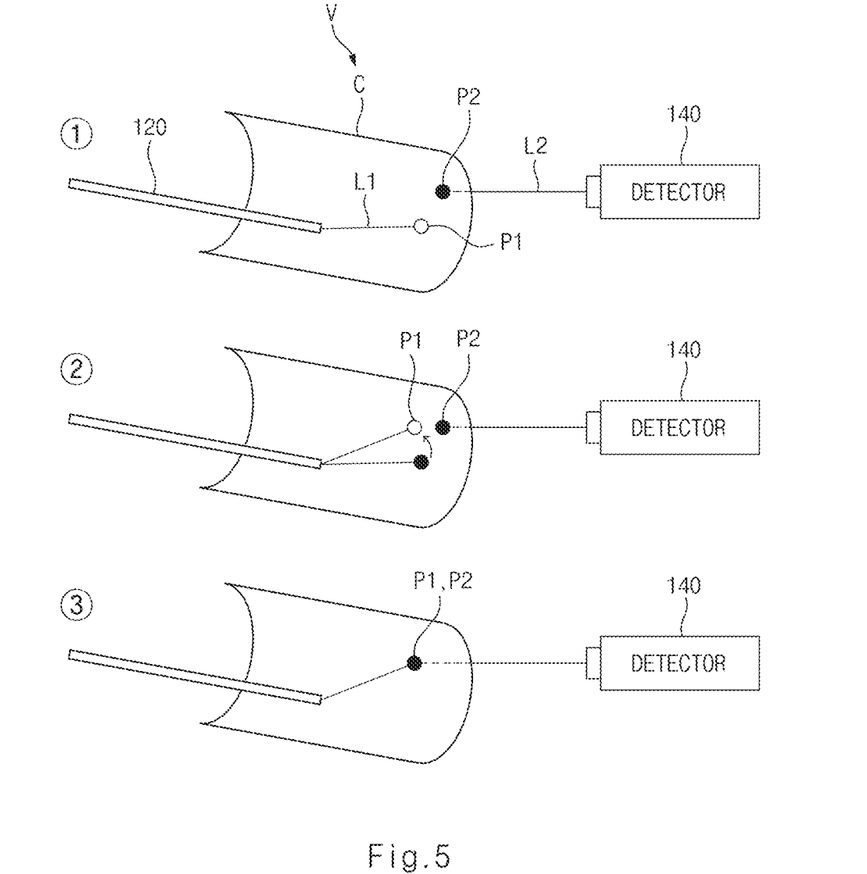
FIG. 5 is a view conceptually illustrating a process of matching the first point and the second point.

Hereinafter, in order to increase the accuracy of the inspection, a process of controlling the conduit rotator and the detection movement device by the controller is described in detail. For convenience of description, a first point and a second point are defined. The first point P1 may mean a point at which the reflector 130 reflects the excitation laser L1 oscillated by the oscillation device 110 to reach the inner surface of the pressure vessel "V". The first point P1 may mean a point at which ultrasonic waves are generated by the excitation laser L1. The second point P2 may mean a point at which the receiving laser L2 oscillated by the detector 140 reaches the outer surface of the pressure vessel "V". FIG. 5 is a view conceptually illustrating a process of matching the first point and the second point.

Because the laser ultrasonic inspection scheme is a scheme of inspecting defects of a structure by generating an ultrasonic wave inside the structure using a pulsed laser and detecting it using another laser, it is possible to obtain accurate results. Accurate results are obtained only when the position of the first point P1 is matched with the position of the second point P2 at which the receiving laser L2 for detection arrives.

The controller 200 may control the conduit rotator 180 and the detection movement device 190 such that the first point P1 and the second point P2 are located at positions corresponding to each other. When it is assumed that the thickness of the pressure vessel "V" converges to '0', the corresponding positions may mean that the positions match.

As an example, when the movement performed by the conduit rotator 180 to allow the excitation laser L1 to reach the first point P1 is called a first movement, and the movement performed by the detection movement device 190 to allow the receiving laser L2 to reach the second point P2 is called a second movement, the controller 200 may control the detection movement device 190 to perform the second movement after controlling the conduit rotator 180 to perform the first movement. The first movement may be a movement for rotating the conduit 120. The second movement may be a movement for moving the detector 140 in the reference direction "D" or the opposite direction.

Hereinafter, with reference to FIG. 5, the above-described process is described in detail. FIG. 5 is a view conceptually illustrating a process of matching a first point and a second point.

Referring to ① of FIG. 5, the positions of the first point P1 and the second point P2 do not match. Meanwhile, the pressure vessel "V" may have a shape similar to that of a cylinder extending in the reference direction "D", and the conduit rotator 180 (FIG. 4) may rotate the conduit 120 about a reference axis extending in the reference direction "D". The detection movement device 190 (FIG. 4) may move in the reference direction "D" and the opposite direction. Meanwhile, because the first point P1 and the second point P2 are two points on the pressure vessel "V", the positions of the first point P1 and the second point P2 may be matched through a process of matching the positions of two points separated from each other having the same R value in the cylindrical coordinate system.

As shown in ② of FIG. 5, the conduit rotator 180 (FIG. 4) may perform the first movement. This may be understood as a process of correcting the θ value in the cylindrical coordinate system. The conduit rotator 180 (FIG. 4) may move the first point P1 in the reference direction of the second point P2 or to the opposite direction through the first movement.

As shown in ③ of FIG. 5, the detection movement device 190 (FIG. 4) may perform the second movement. This may be understood as a process of correcting the z value in the cylindrical coordinate system. Because the first point P1 has already been moved in the reference direction or the opposite direction side of the second point P2 through the first movement, the positions of the first point P1 and the second point P2 may be matched through the second movement of moving the second point P2 in the reference direction or the opposite direction.

According to the present disclosure, the path of the excitation laser L1, oscillated by the oscillation device 110, and the path of the receiving laser L2, oscillated by the detector 140, may be corrected. Thus, the first point P1 at which the excitation laser L1, oscillated by the oscillation device 110, reaches the pressure vessel "V" may be matched with the second point P2 at which the receiving laser L2, oscillated by the detector 140, reaches the pressure vessel "V". Therefore, it is possible to improve the accuracy of the inspection.

<Structure to Solve the Problem of Low Signal-to-Noise Ratio>

Meanwhile, the laser ultrasound inspection scheme may include a scheme of measuring a lamb wave and a scheme of measuring a bulk wave.

Lamb waves propagate in the in-plane direction of the structure, whereas bulk waves propagate in the thickness direction of the structure. Therefore, in examining the pressure vessel "V" having a curved surface structure, it may be beneficial to first consider using the lamb waves propagating in the in-plane direction.

However, when the thickness of the structure exceeds a certain level, the lamb waves do not propagate anymore. In addition, when the lamb wave is measured, it is difficult to accurately determine the shape and size of the defect because the propagation of the ultrasonic wave in the in-plane direction is obtained as a result. To the contrary, because bulk waves may propagate even in a thicker structure, the bulk waves may be applied to type 4 pressure vessels. In addition, when the bulk wave is measured, the progress of the ultrasonic wave propagating in the thickness direction may be obtained as a result (e.g., a result of a C-scan scheme). Thus, the shape and size of a defect may be more accurately determined.

However, because the bulk wave propagates in the thickness direction in a local area, it is desirable to move the inspection apparatus along the inspection area in order to inspect the structure using the bulk wave. However, when moving the inspection apparatus to inspect the pressure vessel "V", it is difficult to control the movement path of the inspection apparatus due to the curved structure of the pressure vessel "V". In addition, due to the curved structure of the pressure vessel "V", as the inspection apparatus moves, the distance between the oscillation device 110 and the detector 140 is changed. Thus, the signal-to-noise ratio is lowered or reduced.

As shown in FIG. 2, although the inspection apparatus, according to an embodiment of the present disclosure, adopts a scheme of measuring ultrasonic waves propagating in the thickness direction, it is possible to solve the problem that the signal-to-noise ratio is lowered or reduced. The problem is solved by rotating the pressure vessel "V" in a state where the irradiation position, the reflection position, and the measurement position of the laser are fixed.

The inspection apparatus, according to an embodiment of the present disclosure, may further include a rotation device 150 for the above-described features.

Figure 7:
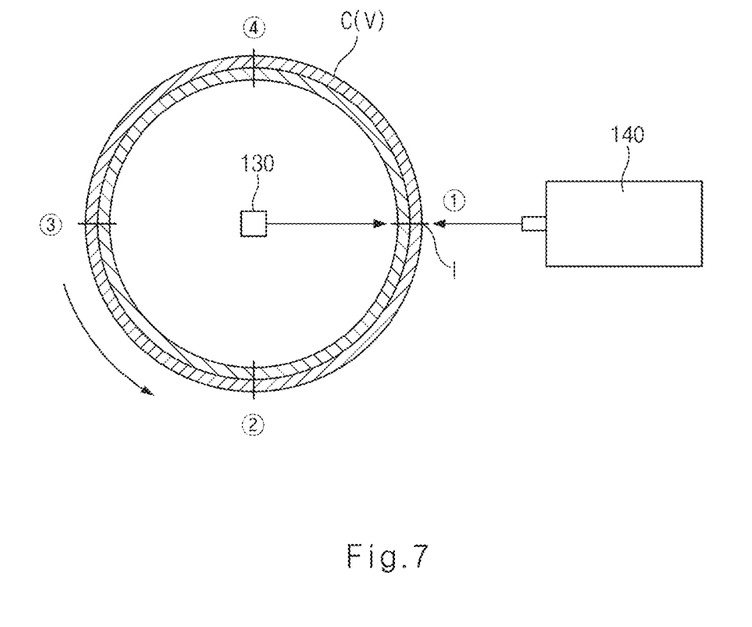
FIG. 7 is a cross-sectional view taken along line X-X of the pressure vessel of FIG. 1.

As shown in FIG. 1, in a state where the conduit 120 is inserted into the type 4 pressure vessel "V", the rotation device 150 may be provided to rotate the pressure vessel "V" about the direction corresponding to the reference direction "D" of the conduit 120 (see FIG. 7). The inspection apparatus, according to an embodiment, may increase the signal-to-noise ratio by rotating the pressure vessel "V" through the rotation device 150 in a state in which the oscillation device 110 and the like are fixed.

An inspection apparatus according to an embodiment of the present disclosure may further include a support part 160 for supporting the pressure vessel "V" while the pressure vessel "V" is rotated by the rotation device 150. As shown in FIG. 1, the support part 160 may include a first support 161 for supporting one end of the pressure vessel "V" such that the pressure vessel "V" is rotatable, and a second support 162 for supporting an opposite end of the pressure vessel "V" such that pressure vessel "V" is rotatable. The first and second supports 161 and 162 may include bearings for such support. The first and second supports may directly support both ends of the pressure vessel "V", respectively. Both ends of the pressure vessel "V" may be indirectly supported through a first rotation shaft 165 and a second rotation shaft 166 as is described below. FIGS. 1 and 2 show indirect support through a rotating shaft.

The type 4 pressure vessel "V" inspected by the inspection apparatus, according to an embodiment, may be a pressure vessel for a hydrogen fuel cell vehicle for storing hydrogen. The pressure vessel may be classified into several types. As a pressure vessel for a hydrogen fuel cell vehicle, as shown in FIG. 1, the type 4 pressure vessel may be used in which a non-metal liner "A" made of plastic, which is wound with a composite material "B" in a filament winding scheme to reinforce the vessel. Carbon fiber and glass may be used together as the composite material "B". As shown in FIG. 1, the type 4 pressure vessel may include a cylinder-shaped cylinder part "C" and first and second boss parts B1 and B2 respectively provided at one end and another end of the cylinder part "C".

The support part 160 of the embodiment may include the first rotation shaft 165 that is fastened to the first boss B1 to rotate together with the pressure vessel "V" and supported to be rotatable by the first support 161. The support part 160 further include the second rotation shaft 166 that is fastened to the second boss B2 to rotate together with the pressure vessel "V" and supported by the second support 162 to be rotatable. The boss part of the pressure vessel "V" is formed with a through-hole "H" communicating the inside and outside of the pressure vessel "V", and a thread is formed on the inner circumferential surface of a boss part defining the through-hole "H".

The first and second rotation shafts 165 and 166 of the embodiment may be provided to be screw-coupled to threads formed in the first and second bosses B1 and B2. The first and second rotation shafts 165 and 166 may be coupled to the first and second bosses B1 and B2 to rotate together with the pressure vessel "V" by screw coupling.

As another example, the first and second rotation shafts 165 and 166 may include a screw thread structure corresponding to the screw thread of an inner circumferential surface of the boss part. The inner circumferential surface of the boss part and the first and second rotation shafts 165 and 166 may be inserted by turning them in a tab bolt manner. Through such a manner, the pressure vessel "V" and the first and second rotation shafts 165 and 166 may be connected more easily.

An inspector using the inspection apparatus of an embodiment fastens one end of the first rotation shaft 165 to the first boss B1 of the pressure vessel "V" and inserts another end into the bearing of the first support 161. In addition, by fastening one end of the second rotation shaft 166 to the second boss B2 of the pressure vessel "V" and inserting another end into the bearing of the second support 162, the pressure vessel "V" may be rotatably supported by the first and second supports 161 and 162.

The rotation device 150 of the embodiment may include a chuck 151 for selectively fixing the first rotation shaft 165 and may include a rotation stage 153 for rotating the chuck 151. As shown in FIG. 1, the chuck 151 of the embodiment is provided to selectively grip the first rotation shaft 165 like a conventional chuck. The chuck 151 of the embodiment may rotate the pressure vessel "V", which is rotatably supported by the first and second supports 161 and 162, when the rotation stage 153 of the embodiment rotates the chuck 151 in a state where the first rotation shaft 165 rotatably supported by the first support 161 is held. The rotation stage 153 of the embodiment may be a conventional rotation stage for generating rotation or may be a conventional driving device using a motor or the like.

The second rotation shaft 166 of the embodiment may be formed in a pipe shape having an inner hollow. In addition, the second rotation shaft 166 of the embodiment may be provided to be inserted into the through-hole "H" of the second boss B2. The conduit 120 of the embodiment may be provided to be inserted from the outside to the inside of the pressure vessel "V" through the inner hollow of the second rotation shaft 166 as shown in FIGS. 1 and 2. Through such a structure, in the inspection apparatus of the present embodiment, the conduit 120 may not interfere with the rotation of the pressure vessel "V" even while the pressure vessel "V" is rotated by the rotation device 150.

The inspection apparatus of the embodiment proceeds with the inspection while rotating the pressure vessel "V" through the rotation device 150 in a state in which the oscillation device 110 and the like are fixed. Accordingly, the inspection of the cylinder "C" in the circumferential direction of the cylinder "C" may proceed. As described above, after the inspection is performed in the circumferential direction at a specified location (see ⓐ in FIG. 2) of the cylinder "C", it is desirable to perform the inspection in the circumferential direction at another location (see ⓑ in FIG. 2) of the cylinder "C".

To this end, the inspection apparatus, according to an embodiment of the present disclosure, may further include the movement device 170. The movement device 170 may be provided to move the support part 160 in a direction corresponding to the reference direction "D" in a state in which the support part 160 supports the pressure vessel "V".

In order to change the inspection position from ⓐ to ⓑ in FIG. 2, the movement device 170 may move the support part 160 to the left with respect to FIG. 2. When the support part 160 moves to the left, the pressure vessel "V" supported by the support part 160 also moves to the left. However, because the conduit 120 is inserted into the inner hollow of the second rotation shaft 166, the conduit 120 does not move in the reference direction "D" despite the movement of the pressure vessel "V". Accordingly, the inspection location may be changed from ⓐ to ⓑ in FIG. 2. In order to ensure non-movement of the conduit 120, for example, the conduit 120 may be fixed to a fixing base on which the oscillation device 110 is installed.

Meanwhile, the first and second supports 161 and 162, and the rotation device 150 may move together. To this end, the support part 160 may further include a moving base 168 on which the first and second supports 161 and 162 and the rotation device 150 are installed together as shown in FIG. 1. In addition, the movement device 170 may be provided to move the moving base 168 to the left or right with reference to FIGS. 1 and 2. To this end, the movement device 170 may be configured as a conventional linear stage. The movement device 170 may include a linear motor for linear movement of the moving base 168.

Hereinafter, an inspection process through the inspection apparatus of the embodiment is described with reference to FIGS. 1 and 2. For convenience of description, the process of matching the positions of the first point P1 and the second point P2 to each other has been described above, and thus has been omitted here.

First, one end of the first rotation shaft 165 is fastened to the first boss B1 of the pressure vessel "V", and another end is inserted into the bearing of the first support 161. Next, one end of the second rotation shaft 166 is fastened to the second boss B2 of the pressure vessel "V", and another end is inserted into the bearing of the second support 162. Thus, the pressure vessel "V" may be rotatably supported by the support part 160. Next, the first rotation shaft 165 is fixed to the chuck 151 of the rotation device 150. Next, the conduit 120 is inserted from the outside to the inside of the pressure vessel "V" through the inner hollow of the second rotation shaft 166. Next, the oscillation device 110 is aligned at another end of the conduit 120 located outside the pressure vessel "V." Next, as needed or desired, the location of the detector 140 is adjusted to correspond to the reflector 130. The order described above may be changed as needed or desired.

When the inspection is ready, the pressure vessel "V" is rotated by rotating the first rotation shaft 165 through the rotation device 150. While the pressure vessel "V" is rotated, the oscillation device 110, the conduit 120, the reflector 130, and the detector 140 do not move. Because the pressure vessel "V" rotates while the detector 140 and the like do not move, the inspection apparatus of the embodiment may inspect the cylinder "C" of the pressure vessel "V" in the circumferential direction of the cylinder "C" in a state where the signal-to-noise ratio is improved.

After one revolution of the pressure vessel "V", for example, the moving base 168 is moved to the left with respect to FIG. 2 through the movement device 170 to change the inspection position from 'ⓐ' to 'ⓑ' in FIG. 2. Then, while rotating the pressure vessel "V" again, the pressure vessel "V" is inspected in the circumferential direction of the cylinder "C". Such an inspection is entirely performed in the longitudinal direction of the cylinder "C".

Figure 6:
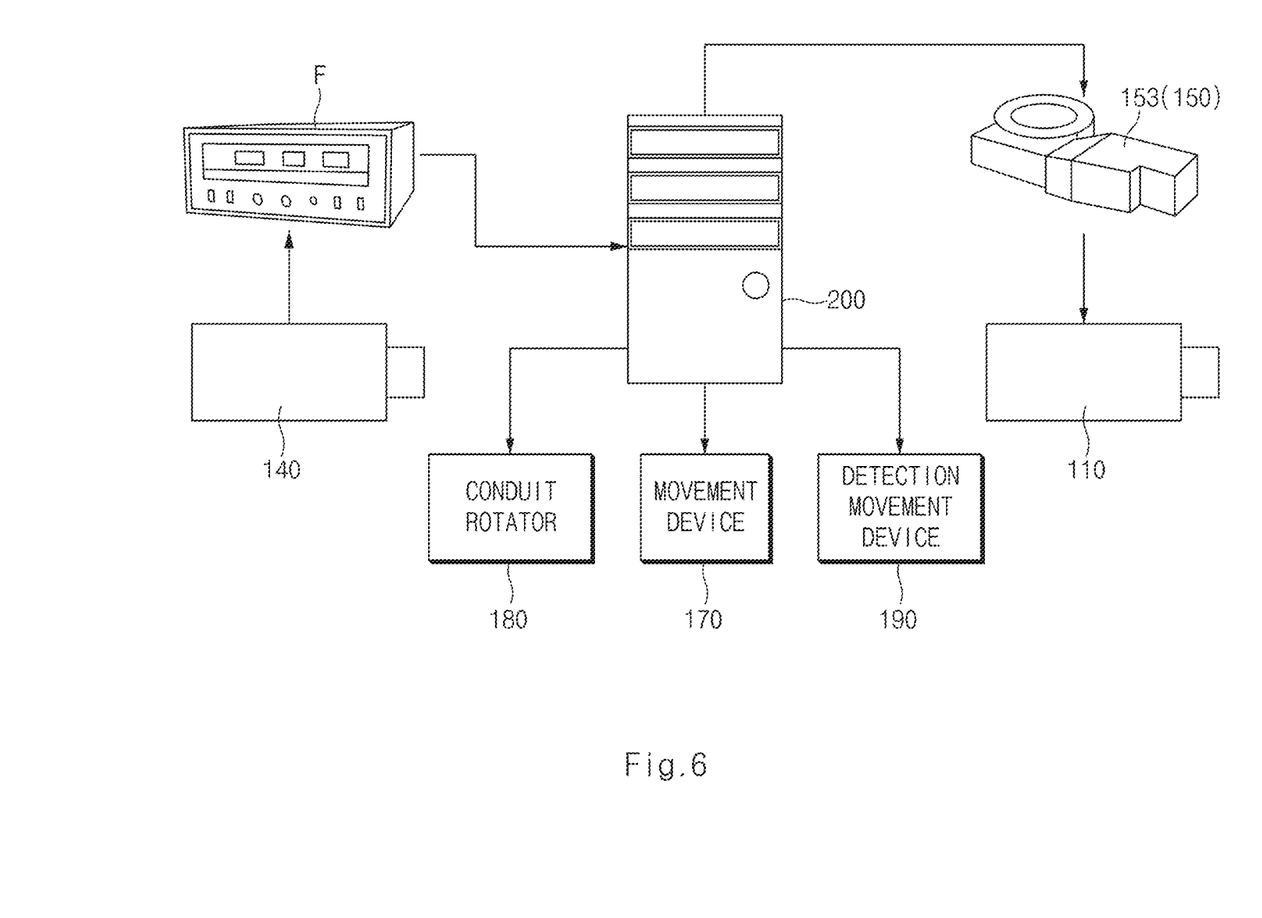
FIG. 6 is a view illustrating a control flow applied to the inspection apparatus of FIG. 1.

The controller 200 of the embodiment may be electrically connected to the rotation device 150 to control the rotation device 150, as shown in FIG. 6. FIG. 6 is a view illustrating a control flow applied to the inspection apparatus of FIG. 1.

When an inspection start signal is input to the controller 200, the controller 200 may first control the rotation device 150 to rotate the first rotation shaft 165 at a specified angular speed. In response to the rotation of the first rotation shaft 165 at a specified angle, the oscillation device 110 may emit a laser pulse, and the detector 140 may detect the ultrasonic waves generated in the pressure vessel "V" by the laser pulse of the oscillation device 110. Through such a process, the uppermost (e.g., top) inspection result among the four inspection results of (a) of FIG. 8 may be obtained.

Figure 8:
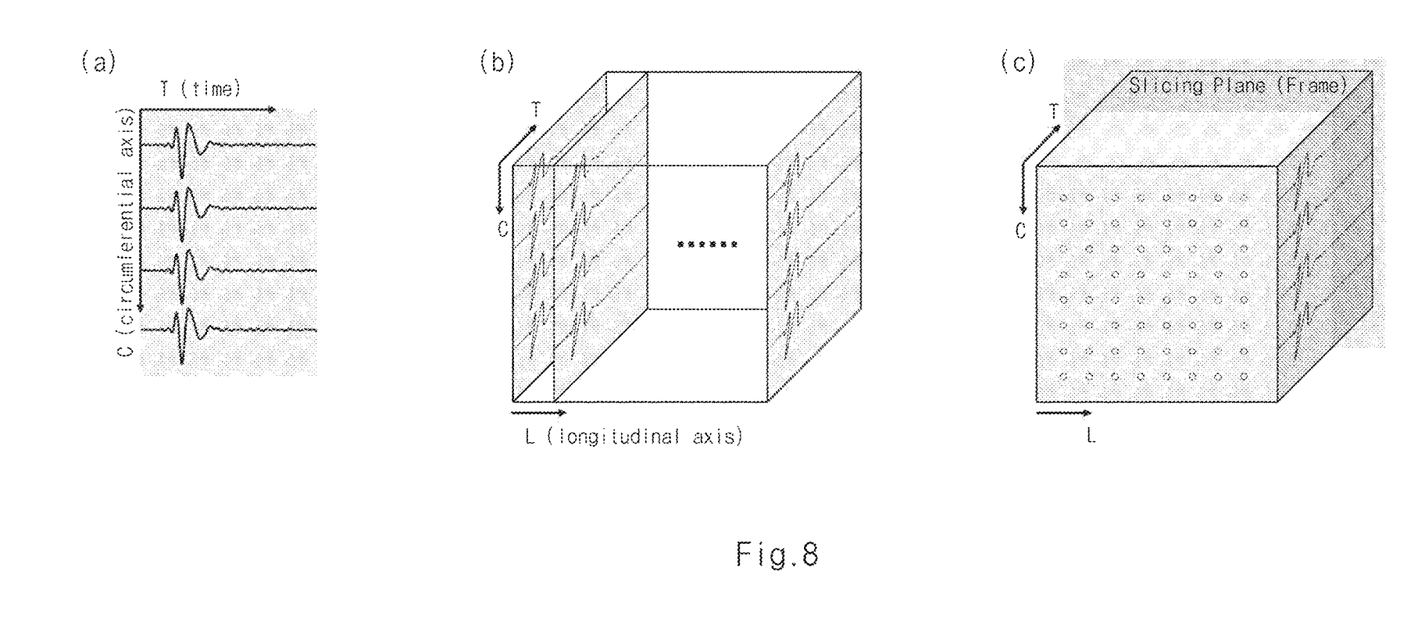
FIG. 8 is a view illustrating visualized inspection results obtained by the inspection apparatus of FIG. 1.

FIG. 8 is a view illustrating visualized inspection results obtained by the inspection apparatus of FIG. 1. FIG. 8 is a view illustrating an ultrasonic wave propagation imaging (UWPI) algorithm applied. Reference numeral 'F', as shown in FIG. 6, designates a band pass filter that is used to selectively receive a signal of a desired frequency band.

The rotation device 150 of the embodiment may be provided to transmit an oscillation signal to the oscillation device 110 for every specified cycle. The oscillation device 110 may be provided to emit a laser pulse when receiving the oscillation signal of the rotation device 150. The detector 140 may be provided to detect the ultrasonic waves generated in the pressure vessel "V" when the oscillation device 110 emits a laser pulse.

The oscillation signal may be transmitted hundreds to thousands of times during one rotation. For convenience of description, a case in which an oscillation signal is transmitted four times during one rotation is exemplified in FIG. 7. For example, the rotation device 150 may transmit an oscillation signal four times to the oscillation device 110 while the first rotation shaft 165 is rotated once. As shown in FIG. 7, the cylinder "C" starts to rotate in a state where the part ① of the cylinder "C" is located at the inspection position "I". FIG. 7 is a cross-sectional view taken along line X-X of the pressure vessel of FIG. 1. As the oscillation signals are transmitted four times during one rotation, parts ②, ③, ④, and ① of the cylinder "C" arrive at the inspection position "I" in sequence. Thus, all four inspection results of (a) of FIG. 8 may be obtained during one rotation of the cylinder "C".

When the inspection for one rotation is completed as described above, the pressure vessel "V" is moved to perform the inspection for one rotation again at the next position. Thus, the second test result from the left of (b) of FIG. 8 may be obtained. When such an inspection is performed for the entire length of the cylinder "C", the inspection result of (c) of FIG. 8 may be obtained. When the rectangular parallelepiped shown in (c) of FIG. 8 is cut along the time axis, an intensity map may be obtained. The N number of intensity maps may be N number of freeze frames in generating a wave propagation image.

In detail, the defect visualization scheme of UWPI is to display the intensity difference between adjacent ultrasound waves as shown in (c) of FIG. 8. Therefore, as high-intensity ultrasonic waves propagate, even minute defects may be visualized. In order to propagate high-intensity ultrasonic waves, it is advantageous that the energy per pulse of the laser oscillated by the oscillation device 110 is higher at a level that does not deform the inner surface of the pressure vessel "V".

In this embodiment, the oscillation device 110 may oscillate a laser having an energy of 22 mJ per pulse. In this embodiment, an excitation laser of 22 mJ per pulse is selected in consideration of the internal surface deformation and defect visualization performance of the type 4 pressure vessel. However, this is only an example. The excitation lasers may output differently depending on the type of the pressure vessel "V" being utilized.

As another scheme for improving the defect visualization performance in the UWPI freeze frame, there may be a scheme of changing the wavelength or lens of the measurement laser detector 140. For example, when the surface of the type 4 pressure vessel is reinforced with a high-transmittance material, such as Glass Fiber Reinforced Polymer (GFRP), a long-wavelength laser may be used in consideration of the reflectance of the measuring laser. Alternatively, a lens having a close measurement distance may be used.

Meanwhile, as shown in FIG. 6, the controller 200 of the embodiment may be electrically connected to the movement device 170 to control the movement device 170. In more detail, on the basis of the input length of the cylinder "C", the controller 200 may determine the distance at which the movement device 170 moves the support part 160 after one rotation of the pressure vessel "V" and the number of movements of the support part 160. For example, when the length of the cylinder "C" is 1 m, the controller 200 may start the inspection at the left end of the cylinder "C." Then, every time one rotation of the pressure vessel "V" ends, the controller 200 may control the support part 160 to move the movement device 170 to the right by 10 cm a total of 10 times.

The inspection result of the cylinder "C" of the real pressure vessel "V" by the inspection device of the embodiment may detect a defect or damage in the vessel. For example, according to the inspection result of the type 4 pressure vessel, when there is a defect in some area of the pressure vessel, it is possible to determine that the defect occurs in the visualization scheme such as UWPI because it interferes with the propagation of the bulk wave. The inspection apparatus of the embodiment may perform a non-destructive inspection on the entire thickness of the pressure vessel and the entire length of the cylinder even when inspecting the type 4 pressure vessel.

According to the present disclosure, because the path of the laser oscillated by the oscillation device and the path of the laser oscillated by the detector may be modified, the point at which the laser oscillated by the oscillation device reaches the pressure vessel may correspond to the point at which the laser oscillating by the detector reaches the pressure vessel. Therefore, it is possible to improve the accuracy of the inspection.

Although embodiments of the present disclosure have been described for illustrative purposes, those having ordinary skill in the art should appreciate that various modifications, additions, and substitutions are possible without departing from the scope and spirit of the disclosure. Therefore, the embodiments disclosed in the present disclosure are provided for the sake of descriptions, not limiting the technical concepts of the present disclosure. It should be understood that such embodiments are not intended to limit the scope of the technical concepts of the present disclosure. The protection scope of the present disclosure should be understood by the claims below and all the technical concepts within the equivalent scopes should be interpreted to be within the scope of the right of the present disclosure.

What is claimed is:

1. An inspection apparatus for a pressure vessel, the inspection apparatus comprising:
   an oscillation device configured to oscillate an excitation laser for exciting the pressure vessel;
   a conduit extending in a reference direction to guide the excitation laser oscillated from the oscillation device to an inside of the pressure vessel, wherein the conduit is inserted into the pressure vessel such that the conduit has one end located inside the pressure vessel and an opposite end located outside the pressure vessel;
   a reflector provided at the one end of the conduit located inside the pressure vessel to reflect the excitation laser guided by the conduit in a specified direction; and
   a detector configured to detect ultrasonic waves generated in the pressure vessel by the excitation laser reflected by the reflector by oscillating a receiving laser from the outside of the pressure vessel,
   wherein at least one of the conduit, the reflector, or the detector moves to correct an optical path of the excitation laser or the receiving laser.

2. The inspection apparatus of claim 1, wherein the conduit is provided to be rotatable about a virtual reference axis extending in the reference direction,
   wherein the reflector is provided to rotate interlocking with rotation of the conduit, and
   wherein an optical path of the excitation laser is modified according to rotation of the reflector.

3. The inspection apparatus of claim 1, wherein the detector is movable in the reference direction and in a direction opposite to the reference direction.

4. The inspection apparatus of claim 1, further comprising:
   a conduit rotator coupled to the conduit to rotate the conduit about a virtual reference axis extending in the reference direction;
   a detection movement device coupled to the detector to move the detector in the reference direction and an opposite direction to the reference direction; and
   a controller that is electrically connected to the conduit rotator to control rotation of the conduit and that is electrically connected to the detection movement device to control movement of the detector.

5. The inspection apparatus of claim 4, wherein the controller controls the conduit rotator and the detection movement device to allow a first point and a second point to be located at positions corresponding to each other,
   wherein the first point is a point at which the reflector reflects the excitation laser oscillated by the oscillation device to reach an inner surface of the pressure vessel, and
   wherein the second point is a point at which the receiving laser oscillated by the detector reaches an outer surface of the pressure vessel.

6. The inspection apparatus of claim 5, wherein the controller controls the detection movement device to perform a second movement after controlling the conduit rotator to perform a first movement,
   wherein the first movement is a movement performed by the conduit rotator to allow the excitation laser to reach the first point, and
   wherein the second movement is a movement performed by the detection movement device to allow the receiving laser to reach the second point.

7. The inspection apparatus of claim 4, wherein the detection movement device includes:
   a rail member extending in the reference direction; and
   a transfer member that is movable along the rail member in the reference direction and the opposite direction and that is coupled to the detector.

8. The inspection apparatus of claim 1, further comprising:
   a rotation device provided to rotate the pressure vessel around the reference direction.

9. The inspection apparatus of claim 8, further comprising a support part that includes:
   a first support configured to support one end of the pressure vessel such that the pressure vessel is rotatable; and
   a second support configured to support another end of the pressure vessel such that the pressure vessel is rotatable.

10. The inspection apparatus of claim 9, wherein the pressure vessel includes:
    a cylinder provided to store gas therein; and
    first and second bosses respectively provided at one end and another end of the cylinder,
    wherein the support part further includes:
    a first rotation shaft that is detachably fastened to the first boss to rotate together with the pressure vessel and that is rotatably supported by the first support; and
    a second rotation shaft that is detachably fastened to the second boss to rotate together with the pressure vessel and that is rotatably supported by the second support.

11. The inspection apparatus of claim 10, wherein the second rotation shaft is formed in a pipe shape having an inner hollow, is formed in the second boss, and is inserted into a through-hole providing communication between the inside and the outside of the pressure vessel, and
    wherein the conduit is inserted from the outside to the inside of the pressure vessel through the inner hollow of the second rotation shaft.

12. The inspection apparatus of claim 9, further comprising:
    a movement device provided to move the support part in the reference direction and the opposite direction while the support part supports the pressure vessel.

* * * * *